United States Patent [19]

Dimas

[11] Patent Number: 5,346,511
[45] Date of Patent: Sep. 13, 1994

[54] ANTIFOAM/DEFOAMER COMPOSITIONS FOR BAYER PROCESS

[75] Inventor: Peter A. Dimas, Wheaton, Ill.

[73] Assignee: Nalco Chemical Company, Naperville, Ill.

[21] Appl. No.: 30,745

[22] Filed: Mar. 12, 1993

[51] Int. Cl.$^5$ .............. B01J 19/00; C01F 7/04; C01F 7/06; C01F 7/08

[52] U.S. Cl. .............. 23/293 R; 423/119; 423/121; 423/130; 252/321; 252/358

[58] Field of Search .............. 423/119, 121, 130, 131; 252/321, 358; 23/293 R

[56] References Cited

U.S. PATENT DOCUMENTS

| | | | |
|---|---|---|---|
| 4,009,119 | 2/1977 | Poschmann et al. | 252/358 |
| 4,036,931 | 7/1977 | Roberson et al. | 423/127 |
| 4,280,987 | 7/1981 | Yamada et al. | 423/130 |
| 4,434,142 | 2/1984 | Huckabay | 423/111 |
| 4,968,448 | 11/1990 | Svarz | 252/358 |
| 5,275,628 | 1/1994 | Dimas et al. | 423/121 |

FOREIGN PATENT DOCUMENTS

45528/89 11/1989 Australia.

OTHER PUBLICATIONS

Search 4496: Polypropylene Glycol in the Bayer Alumina Process (no date).

Primary Examiner—Wayne Langel
Assistant Examiner—Steven Bos
Attorney, Agent, or Firm—Robert A. Miller; Joseph B. Barrett; James J. Drake

[57] ABSTRACT

A method for defoaming a Bayer process liquor, the method comprising the steps of adding to the Bayer process liquor an effective amount of an antifoam/defoamer composition comprising a polyether surfactant and a polyhydric alcohol fatty acid ester.

4 Claims, 1 Drawing Sheet

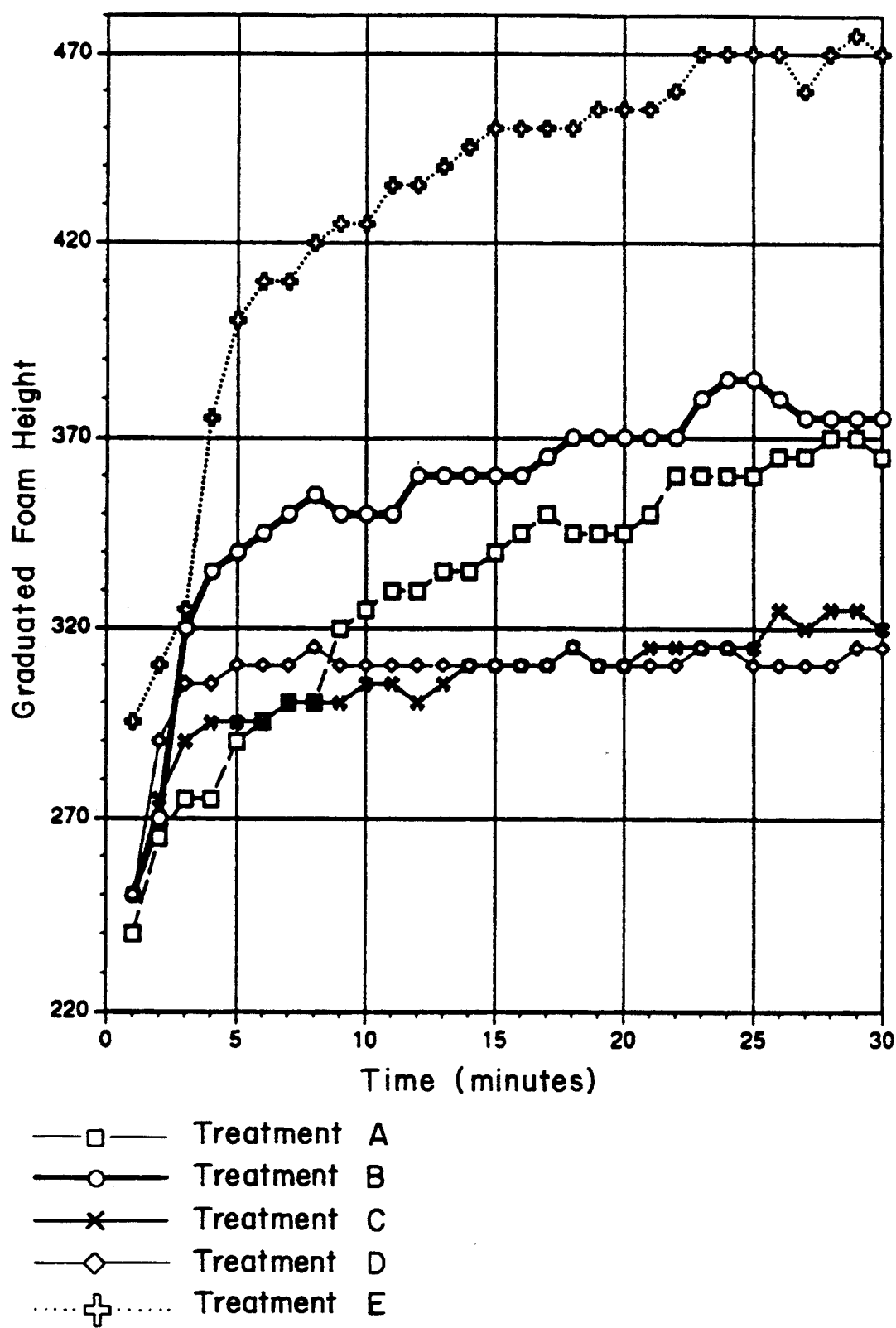
Figure

ANTIFOAM/DEFOAMER COMPOSITIONS FOR BAYER PROCESS

BACKGROUND OF THE INVENTION

1. Field Of the Invention

The present invention is directed to improving the Bayer process; and, more particularly, reducing the foam formed in the liquor of the Bayer process.

2. Description of Prior Art

In the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. After digestion, the slurry then passes through several flash tanks wherein the pressure of the digested slurry is reduced from several atmospheres to one atmosphere and the temperature of the slurry is reduced from about 400° F. to about 220° F.

The aluminate liquor leaving the flashing operation contains from about 1 to about 20 weight percent solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. Any Bayer process slurry taken from the digesters through any subsequent dilution of the slurry, including the flash tanks, but before the primary settler, is referred hereinafter as the primary settler feed. The slurry of aluminate liquor leaving the flash tanks is diluted by a stream of recycled wash overflow liquor.

Normally, the primary settler feed is thereafter fed to the center well of the primary settler, where it is treated with a flocculant. As the mud settles, clarified sodium aluminate solution, referred to as "green" or "pregnant" liquor, overflows a well at the top of the primary settler and is collected. This overflow from the primary settling tank is passed to the subsequent process steps. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

Because of the organic content of Bayer liquor, it has a natural tendency to foam. The foaming of the liquor is aggravated by mechanical agitation, by air-sparging, and by transfer of the liquor from one vessel to the next. Foaming generally occurs after separation of the red mud, and before and during the precipitation of alumina trihydrate. Foam can also develop in transfer points. Foam can occur at any point after the digestion step where the pressure of the digested slurry is reduced to 1 atmosphere. Foaming is especially a problem after separation of the red mud.

The foam poses safety hazards in that the overflow of foam on vessel surfaces is a hazard to process workers since the foam is extremely caustic. The workers would suffer chemical burns upon contact with the foam. It is critical to eliminate or reduce the foam because employee safety is very important to both the employee and the process operator.

The foam also complicates the heat control of the process. Because a vessel surface covered with foam serves as an insulator which retards heat loss, thermal control of the process is difficult. This is especially important because processors strive to reduce liquor temperature during precipitation in order to maximize yield of the product alumina trihydrate.

Vessels filled with large amounts of foam cannot be filled with the maximum quantity of liquor. It is important to fill the vessel completely with liquor in order to maximize product yield and process efficiency. In light of the above safety, engineering and economic problems caused by Bayer process foam, many have attempted to ameliorate the problem of foaming.

A variety of treatment types have been employed in the past, including alcohols, glycols, silicon compounds, hydrophobic silica, wax emulsions and fatty acid based treatments. Many of the above chemical treatments do not work in all Bayer process liquors. Of the treatments that do work, many are not persistent antifoam/defoamers, in that the activity diminishes as the treatment chemical moves through consecutive precipitation vessels.

The cost of the above chemical treatments is also high. In a competitive economic climate, a defoamer/antifoam composition having a reduced cost would provide a great economic benefit.

Several of the prior art antifoam/defoamer treatments are malodorous, volatile or hazardous to workers in Bayer process facilities. Operators are actively seeking antifoam/defoaming treatments which are more worker-friendly and environmentally benign.

Several of the antifoam/defoamer compositions listed above, such as the fatty acid based materials, adversely affect crystal size distribution. Also, some antifoam/defoamer compositions such as silica or silicone introduce an undesirable impurity into the Bayer liquor which can reduce the purity, quality and salability of the product alumina trihydrate. This interferes with the control of the process. Accordingly, process operators would like to replace these antifoam/defoaming treatments with a different treatment which does not negatively impact the overall control of the process.

In light of the enormous difficulties posed by the foaming problem in Bayer process liquors and the inadequate antifoam/defoaming treatments currently available, it would be advantageous to provide an antifoam/defoamer composition which prevents or ameliorates Bayer process foam without the problems caused by currently available antifoam/defoamer treatments.

SUMMARY OF THE INVENTION

One aspect of the invention provides a method for defoaming Bayer process liquors. According to the invention, Bayer process liquor is treated with an effective amount of an antifoam/defoamer composition comprising a polyether surfactant and a polyhydric alcohol fatty acid ester which is added to the liquor. Preferably, the antifoam/defoamer composition of the invention is added in an effective amount of from about 1 to about 200 parts per million (ppm) or, more preferably, in an effective amount of from about 1 to about 50 ppm. The present invention inhibits the formation of foam or defoams a Bayer process liquor. For a variety of reasons, this results in a significant cost savings in the production of alumina trihydrate.

BRIEF DESCRIPTION OF THE DRAWINGS

FIG. 1 graphically represents the defoaming activity of the antifoam/ defoamer compositions of the present invention compared to controls and the individual constituents comprising the compositions of the invention.

DESCRIPTION OF THE PREFERRED EMBODIMENTS

The present invention provides an antifoam/defoamer composition composing a polyether surfactant and a polyhydric alcohol fatty acid ester. Polyether surfactants and polyhydric alcohol fatty acid esters which are useful in the practice of the invention are described in detail in U.S. Pat. No. 4,968,448, the disclosure of which is incorporated hereinafter by reference.

Preferably, the polyether surfactant is mixed with the polyhydric alcohol fatty acid ester in a ratio of from about 10:90 to 90:10 percent by weight, respectively. The polyether surfactant is preferably one compound selected from the group consisting of polyoxyalkylated glycerol, polyoxyalkylated sorbitol or sorbitan, polyoxyalkylated sucrose, and isomers thereof. Accordingly, to one embodiment of the invention, the polyoxyalkylated glycerol, sorbitol or sucrose contain ethylene oxide in the range between about 0-60 weight percent, and, more preferably, in the range between 0-30 weight percent. According to another embodiment of the invention, propylene oxide is included in the range between about 30-100 weight percent. The polyether surfactants of the invention have demonstrated usefulness over a wide range of molecular weights. Preferably, the polyether surfactants have a molecular weight in the range between about 1000-10,000. More preferably, the polyether surfactants have a molecular weight of from about 1,000 to about 8,000.

According to a more preferred embodiment, the polyether surfactant includes a glycerol heteropolymer or block copolymer with ethylene oxide and/or propylene oxide in an amount such that the total molecular weight of the polyether surfactant is about 2,000-7,000 and such that it contains between about 0-30 ethylene oxide by weight.

One example of such a polyether surfactant is the reaction product of glycerol with 70 moles of propylene oxide followed by reaction with 16 moles of ethylene oxide yielding a polyether surfactant having a molecular weight to about 4900. Another useful polyether surfactant is obtained by reacting sorbitol with ethylene oxide and propylene oxide. The final product having a molecular weight of about 6700 based on hydroxyl number, a cloud point in distilled water of 64° F. (1.0% soln.), and reduces surface tension of water to 37 dynes $cm^{-1}$ at a concentration of 0.01% by weight.

The polyhydric alcohol fatty acid ester of the invention is preferably a polyalkylene glycol ester of fatty acids prepared by either oxyalkylation or esterification. Preferably, the polyethylene glycol ester contains from about 1 to about 20 moles of ethylene oxide. The polyethylene glycol ester is a diester of fatty acids. More preferably, the polyethylene glycol ester is a 200-800 mono and/or diesters of oleic, tall oil, or stearic acids. Furthermore, the polyhydric alcohol fatty acid ester contains between about 1-20 moles of ethylene oxide and/or propylene oxide. Commercially available polyhydric alcohol fatty acid esters are sold under the trademarks KESSCO (polyethylene glycol ester) by Stepan Chemical Company and EMEREST (polyethylene glycol ester) by Emery Chemical Industries, Inc.

One polyethylene glycol ester is obtained by reaction of a fatty acid, such as, oleic, tall oil or stearic acid with polyethylene glycol liquid and solid polymers of the general formula $H(OCH_2CH_2)_nOH$, where n is between about 3 to about 10 or a mixture of the polyethylene glycol esters. According to one embodiment, the polyhydric alcohol fatty acid ester of the invention includes a fatty acid mono and/or diesters of polyethylene and/or polypropylene glycols reacted with oleic, tall oil or tallow derived fatty acids.

Preferably, the polyethylene glycol ester contains from about 1 to about 20 moles of ethylene oxide. The polyethylene glycol ester is obtained by reaction of a fatty acid, such as, oleic, tall oil or stearic acid with polyethylene glycol liquid and solid polymers of the general formula $H(OCH_2CH_2)_nOH$, where n is between about 3 to about 10 or a mixture of the polyethylene glycol esters. The term oleic as used herein shall include oleic, linoleic, linolenic, or combination thereof. The term stearic acid as used herein shall include stearic and/or palmitic acids.

The polyhydric alcohol fatty acid ester may also include fatty acid esters of other polyhydric alcohols, such as, glycerol, sorbitol or sorbitan, sucrose, and isomers of these alcohols. Fatty acids reacted with these alcohols include oleic, tall oil, castor oil and tallow derived fatty acid. These fatty acid esters may be further modified with alkoxylation. Commercially available surfactants are sold under the trademarks SPAN, TWEEN, ARLACEL, ARLATONE, and MYRJ by ICI Americas.

According to the invention, the antifoam/defoamer composition is added to the Bayer liquor immediately after digestion, and immediately prior to, during and after the steps of red mud separation, crystallization, and filtration of the product alumina trihydrate. Preferably, the antifoam/defoamer composition includes an oil carrier, but may be added to the liquor next. One preferable antifoam/defoamer composition includes a glycerol heteropolymer of block copolymer with ethylene oxide and/or propylene oxide such that the total molecular weight is about 800-8000, and which contains approximately 0-30% ethylene oxide by weight. This polyether surfactant is admixed with a polyhydric alcohol fatty acid ester, such as, polyethylene glycol 200-600 mono and/or dioleate. The antifoam/defoamer composition is preferably added to the Bayer liquor in a concentration of from about 1 to about 200 parts per million (ppm), and, more preferably, in a concentration of from about 1 to about 100 ppm. Most preferably, however, the antifoam/defoamer composition is added to the Bayer liquor in a concentration of from about 1 to about 50 ppm.

The following example is presented to describe preferred embodiments and utilities of the invention and are not meant to limit the invention unless otherwise stated in the claims appended hereto.

EXAMPLE 1

The following test method was used.

Bayer liquor was obtained from an operating Bayer circuit and adjusted to the alkalinity encountered in precipitation. 225 grams of the liquor was adjusted to 80° Centigrade. Ten grams of commercial alumina trihydrate was added to the liquor and the suspension was shaken for ten seconds. A five microliter dose, which is equivalent to 22 ppm of treatment, was administered to the suspension. Again, the suspension was shaken for ten seconds and then quickly transferred to a graduated cylinder, and immersed in a water bath which was maintained at 70° Centigrade. A gas dispersion tube was then placed into the bottom of the graduated cylinder, and a regulated infusion of air was introduced through the tube into the liquor. The height of the resulting foam head which was generated by the introduction of the air was measured as a function of time. By this method, the tendency of a chemical treatment to reduce foaming of Bayer liquor was evaluated.

A laboratory evaluation of the defoamers of the present invention was conducted as described above. Referring to FIG. 1, four defoaming treatments and a control were evaluated. Treatment A consisted of 37.4% of a dioleate ester of a polyethylene glycol having an average molecular weight 400 in oil; treatment B consisted of 12.8% of an oxyalkylated glycerol in oil; treatment C consisted of 9.5% of an oxyalkylated glycerol and 9.5% of a dioleate ester of a polyethylene glycol having an average molecular weight 400 in oil; treatment D consisted of 7.6% of an oxyalkylated glycerol and 15.3% of a dioleate ester of a polyethylene glycol having an average molecular weight 400 in oil; and treatment E included no antifoam and was the control.

As shown in FIG. 1, the treatments of the invention (treatments C and D) reduced foaming significantly compared to the control and either ingredient used alone.

Changes can be made in the composition, operation and arrangement of the method of the present invention described herein without departing from the concept and scope of the invention as defined in the following claims:

We claim:

1. A method for reducing foam in a Bayer process liquor, the method comprising the steps of adding to the Bayer process liquor an effective amount of an antifoam/defoamer composition comprising a polyoxyalkylated glycerol and a polyhydric alcohol fatty acid ester, wherein the effective amount of the antifoam/defoamer composition added to the Bayer process liquid reduces foam in the Bayer process liquor.

2. The method of claim 1 wherein the polyhydric alcohol fatty acid ester is a fatty acid monoester and/or diester of polyethylene glycol and/or polypropylene glycol.

3. The method of claim 1 wherein the antifoam/defoamer composition is added in an effective amount of from about 1 to about 200 ppm.

4. The method of claim 1 wherein the antifoam/defoamer composition is added in an effective amount of from about 1 to about 50 ppm.

* * * * *

UNITED STATES PATENT AND TRADEMARK OFFICE
CERTIFICATE OF CORRECTION

PATENT NO.  : 5,346,511
DATED       : SEPTEMBER 13, 1994
INVENTOR(S) : PETER A. DIMAS, ET AL

It is certified that error appears in the above-indentified patent and that said Letters Patent is hereby corrected as shown below:

On the title page, under item [19[ after "Dinas" insert --et al.-- ; and in item [75] after "Wheaton" add --James J. Svarz, Naperville, both of--.

Signed and Sealed this

Twenty-ninth Day of November, 1994

Attest:

BRUCE LEHMAN

*Attesting Officer*    *Commissioner of Patents and Trademarks*